Nov. 2, 1943.  J. H. STALEY  2,333,450
QUICK ADJUSTABLE ENGINE STAND BASE
Filed Nov. 17, 1941  2 Sheets-Sheet 1

INVENTOR,
JOSEPH H. STALEY,
By Minturn & Minturn,
ATTORNEYS.

Nov. 2, 1943.  J. H. STALEY  2,333,450
QUICK ADJUSTABLE ENGINE STAND BASE
Filed Nov. 17, 1941  2 Sheets-Sheet 2

INVENTOR,
JOSEPH H. STALEY,
BY Minturn & Minturn,
ATTORNEYS.

Patented Nov. 2, 1943

2,333,450

UNITED STATES PATENT OFFICE 2,333,450

QUICK ADJUSTABLE ENGINE STAND BASE

Joseph H. Staley, Columbus, Ind.

Application November 17, 1941, Serial No. 419,406

4 Claims. (Cl. 248—19)

This invention relates to stands used to support engines while in the process of assembly, inspection, rebuilding and the like. While the use of the invention is not necessarily limited thereto, the invention is adapted for use in the engine building plants wherein the modern airplane engines are being assembled. The invention also finds use in the inspection and repair bases of the military units employing airplanes, tanks, and the like.

A primary advantage of the invention is that the same engine stand may be employed to handle varying sizes of engines whereas heretofore a separate stand had to be used for each different size of engine mounted on the stand. A further primary object of the invention is to provide means for extending or retracting the length of the individual stand quickly and easily without any complicated devices, and for maintaining that length of stand all without weaving and without shifting.

A still further important object of the invention is to provide such means for varying the length of the engine stand that may be produced at a relatively low cost and which will be extremely durable and remain rigid over a long period of time even under extremely hard usage. It is necessary, of course, to employ a very rigid construction to carry the engines being operated upon or being assembled, tending to complicate the problem of providing a simple mechanism for the purpose indicated. In this connection, it is highly desirable to employ a minimum amount of metal, particularly in view of the fact that the use of iron and steel should be economized in order to meet the present defense needs.

Figure 1:
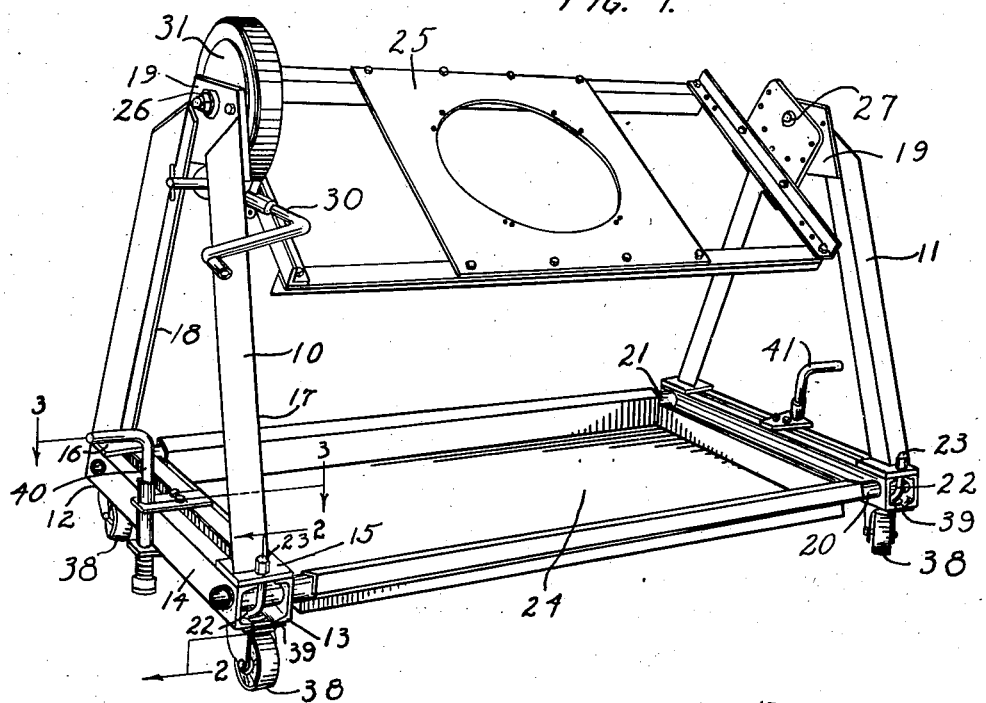
Figure 3:
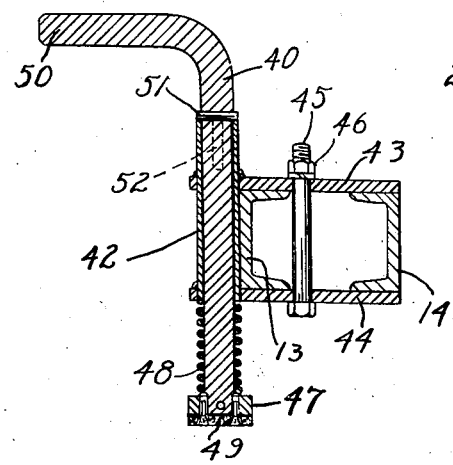
Figure 2:
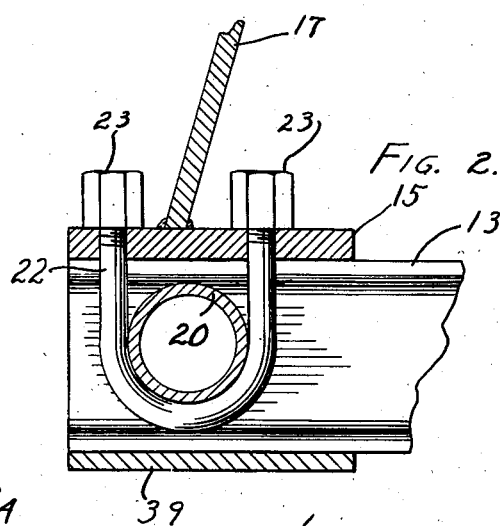
Figure 4:
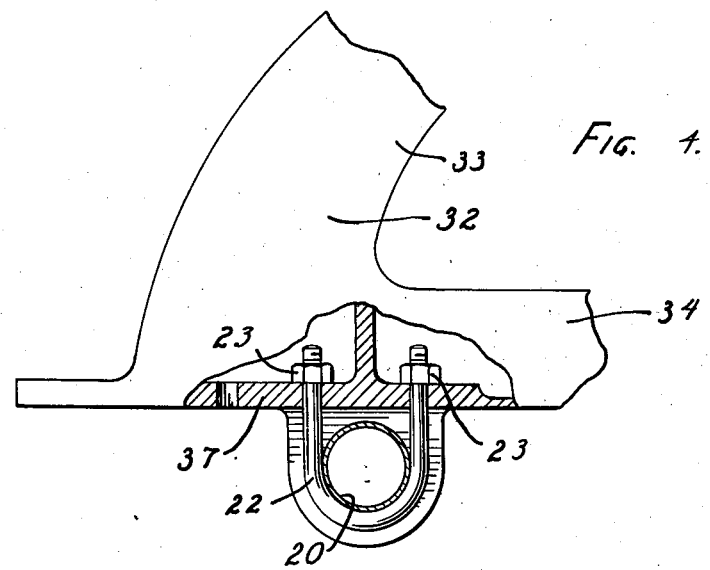
Figure 5:
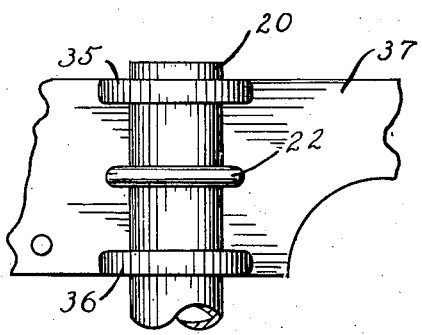

One particular form of the invention is herein described and shown in reference to the accompanying drawings, in which Fig. 1 is a view in perspective of an engine stand embodying the invention;

Fig. 2, a view in section on the line 2—2 in Fig. 1;

Fig. 3, a view in section on the line 3—3 in Fig. 1;

Fig. 4, a detail view in end elevation and partial section of a modified form of the invention;

Fig. 5, a detail view in bottom plan of that modified form; and

Figure 6:
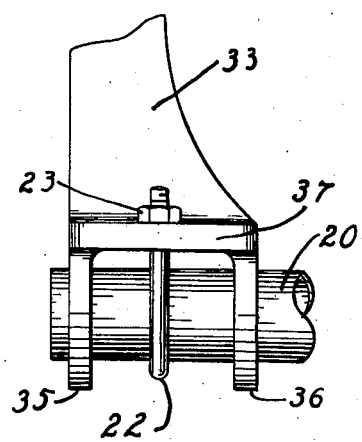

Fig. 6, a view in side elevation thereof.

Like characters of reference indicate like parts throughout the several views in the drawings.

The engine stand frame, as illustrated in Figs. 1–3, is constructed primarily of structural steel members whereas that form of the invention as illustrated in Figs. 4–6 has the engine stand end frame formed as a casting. Referring first to that form of the invention as illustrated in Figs. 1–3, a pair of end frames 10 and 11 are constructed to have a base member, generally designated by the numeral 12, herein shown as built up in the nature of a box girder by employing two spaced apart channel irons 13 and 14, each turned on edge and aligned to have their webs outermost. The plates 15 and 16 are welded across the top outer ends respectively of these two channels 13 and 14. From these plates 15 and 16 extend upwardly and inclined toward a center line, angle bars 17 and 18, their lower ends being welded to those plates 15 and 16 and their upper ends welded to a plate 19. The other end frame member 11 is formed in the same manner. These two end frames 10 and 11 are suitably spaced apart and rigidly maintained in their vertical positions by means of a pair of tubular side rails 20 and 21 respectively.

Referring to Figs. 1 and 2, the rail 20 has its end carried through holes provided in the webs of the channels 13 and 14 with a snug sliding fit. As indicated in Fig. 1, these channels are spaced a substantial distance apart, that is, there is a spacing between the inturned legs thereof, this spacing being maintained by the plates 15 and 16 secured across the sides of the uppermost legs of the respective channels. Thus by sliding the frame 10 along the rail 20, the spacing of that end frame 10 from the other frame 11 may be varied. The spacing apart of the channels 13 and 14 provides considerable distance between their bearing zones on the rails and thereby prevents rocking of the frame in reference to the rails 20. The distance between the end frames 10 and 11 is then fixed by means of a U-bolt 22 passed upwardly between the channels 13 and 14 to engage the rail 20 from its under side and to have the legs of the bolt extend on upwardly through holes provided in the plate 15, Fig. 5. Nuts 23 screw-threadedly engage the upper ends of these legs and are drawn down snugly against the top side of the plate 15. Thus the rail 20 is rigidly gripped by the bolt 22 against the upper sides of the holes through the channels 13 and 14 and shifting of the end frame along the rail 20 is prevented. Furthermore this rigid gripping of the rail further contributes to prevent endwise rocking of the end frame from the vertical. The other end of the rail 20 is similarly engaged with the end frame 11 and the rail 21 is likewise engaged on the opposite side of the stand by its respective ends with the frames 10 and 11. As indicated in Figs. 1 and 2, these rails 20 and 21 are further utilized to support a pan 24 hanging on and extending between the rails.

In the form of the invention herein shown, an engine support 25 is rockably carried between the upper ends of the frames 10 and 11, herein shown as on the pivot bolts 26 and 27 respectively extending through the upper frame plates 19. The support 25 may, in the present showing, be rocked about the pivot bolts 26 and 27 by any suitable means, such as by the crank 30 operating a worm and gear structure within the housing 31, all of which do not enter into the present invention.

In order to prevent having to have an unduly large number of engine support structures, my invention is used by simply varying the lengths of the individual supports 25 for the particular types and sizes of engines to be carried by the structure. Thus where the support 25 is to be shorter than that shown in the present drawings, the support will be removed and the end frames 10 and 11 adjusted inwardly along their respective side rails 20 and 21 to accommodate the shorter support length and then fixed in position or positions depending upon whether one or both of the frames are shifted, all as above described. The pan 24, of course, may be eliminated or even provided in shorter lengths to meet the various conditions.

Referring now to that form of the invention as illustrated in Figs. 4-6, instead of the structural unit make-up of the end frames as described in reference to Figs. 1 and 2, the end frame is shown as a cast unit structure 32 wherein the upright members are integrally cast with a transverse lower connecting beam. Referring to Fig. 4, the upright member 33 is shown as a part of the transverse beam 34 which takes the place of the two channel members 13 and 14 in the structure first described. The under side of the beam is provided with two downwardly extending ears 35 and 36 toward each end thereof and these ears are suitably bored to receive therethrough with a sliding fit the side rail 20, the ears 35 and 36 being spaced a substantial distance apart to provide spaced apart bearings on the rail 20, so as to maintain the end frame in vertical position. A U-bolt 22 is passed upwardly from the under side of the rail 20 from the ears 35 and 36, to extend through a web 37 forming the under side of the member 34 and extending on outwardly under the support 33. The upper ends of the U-bolt 22 are engaged by the nuts 23 for drawing the bolt up against the rail 20 for rigid securement thereof.

In other words the invention is equally well adapted to a built-up end frame and to a cast end frame. As indicated in Fig. 1, the end frames carry casters 38 as a means of easy shifting about of the complete engine support structure, these casters being secured to the under outer ends of the lower end frame members. These casters 38 are attached to base plates 39 secured to the under sides of the cross beam channel irons 13 and 14.

A further important part of the structure embodying the invention consists of means operating with the U-bolts 22 in maintaining the positions of the end frames along the intervening spacing and supporting rails 20 and 21. This means further is employed to prevent shifting about over the floor of the stand when work is being done upon the engine supported by the stand.

The means just referred to consists essentially of a post 40, Figs. 1 and 3, mounted to be vertically reciprocable along the intervening lower cross beam of one end frame. A similar post 41 is likewise mounted to be vertically reciprocable along the cross beam of the other frame 10. Both posts 40 and 41 are identical in structure and are identically mounted and retained on their respective cross beams, and therefore description of one of these posts, post 40, and its mounting is made in reference to Fig. 3.

The post 40 is slidingly carried through a tube 42. This tube 42 is positioned along the channel irons 13 and 14, herein shown as being on the outer side of the channel 13 by any suitable means, such as the top and bottom feet 43 and 44 which respectively pass over the top and under sides of the channel irons 13 and 14. While these feet 43 and 44 may be secured to those irons 13 and 14 in any suitable manner, in the form herein shown, this securing means consists of bolts 45, each passing through both of those feet 43 and 44 and between the channel irons 13 and 14, whereby by means of the nut 46 screw-threadedly engaging the bolt, the two feet may be drawn into compressive engagement with the respective top and under sides of those irons.

The post 40 carries an abutment 47 on its lower end against which the lower end of a spring 48 encircling the post 40 bears. The upper end of the spring 48 bears against a stationary abutment, herein shown as the lower end of the tube 42. The length of the post 40 and also that of the spring 48 are made to be such that normally the spring 48 will tend to push the post 40 downwardly under considerable pressure against the floor. In the form herein shown, the abutment 47 carries a frictional floor engaging member 49 as the actual floor contacting means. This member 49 may be made out of any suitable material, preferably of leather or some such material, as will have a normally long life and engage floors, such as cement floor, firmly without lateral shifting under the pressure of the spring 48.

The upper end of the post 40 carries a lifting member 50, herein shown as a turned over end of the post 40, whereby this member 50 may be grasped by the operator's hands and pulled upwardly to overcome the resistance of the spring 48. The post 40 may be held in an elevated position to have the friction member 49 maintained at an elevation above contact with the floor by any suitable means, one such means herein shown as consisting of a pin 51, Fig. 3, passing through the post 40 above the tube 42 in such manner that the ends of the pin 51 may bear against the top end of that tube. Then to permit lowering of the post 40 for floor contact, the member 50 may be revolved to permit the outer ends of the pin 51 to drop into slots 52 entering from the upper end of the tube 42 and continuing downwardly a sufficient length to prevent the pin 51 from seating in the lower ends of those slots before the post makes floor contact.

As above indicated, the post 41 is mounted and operated in exactly the same manner as has been described in reference to the post 40. Now by lowering these posts 40 and 41 their respective springs 48 exert sufficient pressure to maintain their under friction engaging members firmly in contact with the floor to that extent that under any normal usage of the stand, such as when bolts are being tightened or the like on the engine carried by the stand, the end frames 10 and 11 will be secured in position one in relation to the other without any tendency to shift along the tubes 20 and 21, and in addition will prevent any shifting of the complete stand around over the floor.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. In an engine stand having spaced apart end frames to carry an intervening engine support, means for adjustably spacing said frames to accommodate engine supports of different lengths comprising spaced apart members downwardly extending from near each frame lower corner, said members each having a hole therethrough horizontally aligned on an axis parallel to the longitudinal center line of the stand, the holes at one frame corner aligning with the holes of the members of the opposite frame corner on the same side thereof, and a pair of rails, one rail for each set of aligned holes, said rails being formed to enter and slidingly pass through said holes, a clamp entered between each of said members against the under side of said rails, and means for urging said clamps into rigid engagement with the rails, whereby said rails may have said frames adjustably positioned therealong and be rigidly aligned thereby in respect to each other, said members comprising webs of structural steel members forming in each instance a girder across the lower frame end, a plate across the steel members and fixed thereto, said clamp consisting of a U-bolt passed around the rail and having the bolt legs carried through holes in said plate.

2. In an engine stand having spaced apart end frames to carry an intervening engine support, means for adjustably spacing said frames to accommodate engine supports of different lengths comprising spaced apart members downwardly extending from near each frame lower corner, said members each having a hole therethrough horizontally aligned on an axis parallel to the longitudinal center line of the stand, the holes at one frame corner aligning with the holes of the members of the opposite frame corner on the same side thereof, and a pair of rails, one rail for each set of aligned holes, said rails being formed to enter and slidingly pass through said holes, a U-bolt clamp entered between each of said members against said rails, and means for urging said clamps into rigid engagement with the rails, whereby said rails may have said frames adjustably positioned therealong and be rigidly aligned thereby in respect to each other.

3. In an engine supporting stand having a pair of end frames and a pair of spaced apart supporting and aligning rails therebetween, the combination of a fixed opening bearing in each of said frames for each of said rails to extend therethrough, the bearing in each instance completely surrounding the rail with a sliding fit and engaging the rail to prevent rocking of the frames thereon longitudinally of the rails; a member surrounding in part at least each of said rails adjacent said bearings and means carried by said end frames and engaging said surrounding members to urge the rails into compressive contact with the walls of said bearings to set up frictional engagement therewith and prevent longitudinal shifting of the rails through said bearings.

4. In an engine supporting stand having a pair of end frames and a pair of spaced apart supporting and aligning rails therebetween, the combination of a fixed opening bearing in each of said frames for each of said rails to extend therethrough, the bearing in each instance completely surrounding the rail with a sliding fit and engaging the rail to prevent rocking of the frames thereon longitudinally of the rails; a member surrounding in part at least each of said rails adjacent said bearings and means carried by said end frames and engaging said surrounding members to urge the rails into compressive contact with the walls of said bearings to set up frictional engagement therewith and prevent longitudinal shifting of the rails through said bearings; said bearing in each instance being longitudinally divided and said rail surrounding member engaging said rail between said divided bearing portions.

JOSEPH H. STALEY.